United States Patent
Koseoglu

(10) Patent No.: US 11,142,704 B2
(45) Date of Patent: Oct. 12, 2021

(54) METHODS AND SYSTEMS OF STEAM STRIPPING A HYDROCRACKING FEEDSTOCK

(71) Applicant: SAUDI ARABIAN OIL COMPANY, Dhahran (SA)

(72) Inventor: Omer Refa Koseoglu, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/701,983

(22) Filed: Dec. 3, 2019

(65) Prior Publication Data
US 2021/0163831 A1    Jun. 3, 2021

(51) Int. Cl.
| | |
|---|---|
| C10G 67/16 | (2006.01) |
| B01J 8/04 | (2006.01) |
| B01J 8/00 | (2006.01) |
| C10G 67/14 | (2006.01) |
| B01J 8/02 | (2006.01) |

(52) U.S. Cl.
CPC .............. *C10G 67/16* (2013.01); *B01J 8/00* (2013.01); *B01J 8/004* (2013.01); *B01J 8/02* (2013.01); *B01J 8/04* (2013.01); *C10G 67/14* (2013.01); *C10G 2300/1059* (2013.01); *C10G 2300/1074* (2013.01); *C10G 2300/202* (2013.01); *C10G 2300/301* (2013.01); *C10G 2300/308* (2013.01)

(58) Field of Classification Search
CPC ....... B01J 8/00; B01J 8/02; B01J 8/04; C10G 65/18; C10G 69/14; C10G 2300/301; C10G 2300/308; C10G 2300/202; C10G 2300/1059; C10G 2300/1074
See application file for complete search history.

(56) References Cited

U.S. PATENT DOCUMENTS

| | | |
|---|---|---|
| 3,072,560 A | 1/1963 | Paterson et al. |
| 3,294,673 A | 12/1966 | Peck et al. |
| 5,453,177 A | 9/1995 | Goebel et al. |

(Continued)

FOREIGN PATENT DOCUMENTS

| | | |
|---|---|---|
| GB | 1207719 A | 10/1970 |
| WO | 2010077476 A2 | 7/2010 |

(Continued)

OTHER PUBLICATIONS

International Search Report issued in corresponding International Application No. PCT/US2020/014927, dated Jul. 23, 2020 (6 pages).

(Continued)

*Primary Examiner* — Lessanework Seifu
(74) *Attorney, Agent, or Firm* — Osha Bergman Watanabe & Burton LLP

(57) ABSTRACT

A process for producing cracked hydrocarbons from a feedstock, which includes a top portion that boils below 375° C. and a bottom portion that boils above 375° C., may include stripping the feedstock in a stripper to isolate the top portion from the bottom portion, hydrocracking the bottom portion in one or more hydrocracking reactors to produce a hydrocracked effluent, separating the hydrocracked effluent in a separating unit to produce a light product stream, a distillate stream, and a heavy unconverted stream; and recycling the heavy unconverted stream to an earlier stage of the process.

8 Claims, 6 Drawing Sheets

(56) References Cited

U.S. PATENT DOCUMENTS

| | | |
|---|---|---|
| 6,444,116 B1 | 9/2002 | Galiasso et al. |
| 7,087,153 B1 | 8/2006 | Kalnes |
| 2012/0031811 A1 | 2/2012 | Cowan et al. |
| 2014/0262941 A1 | 9/2014 | Ramaseshan et al. |
| 2016/0122666 A1 | 5/2016 | Weiss et al. |
| 2017/0349844 A1 | 12/2017 | Sauge et al. |
| 2018/0179456 A1 | 6/2018 | Wang et al. |
| 2018/0362864 A1 | 12/2018 | Verstraete et al. |
| 2019/0062654 A1 * | 2/2019 | Ramaseshan .......... C10G 65/12 |

FOREIGN PATENT DOCUMENTS

| | | |
|---|---|---|
| WO | 2013019624 A1 | 2/2013 |
| WO | 2019134811 A1 | 7/2019 |

OTHER PUBLICATIONS

Written Opinion issued in corresponding International Application No. PCT/US2020/014927, dated Jul. 23, 2020 (9 pages).

* cited by examiner

METHODS AND SYSTEMS OF STEAM STRIPPING A HYDROCRACKING FEEDSTOCK

BACKGROUND

Hydrocracking is a widely used process in petroleum refining that is performed in the presence of hydrogen and a suitable catalyst. Hydrocracking treats a hydrocarbon feedstock by removing impurities, such as organosulfur and organonitrogen compounds, and breaking C—C bonds in the high molecular weight components to provide lower molecular weight, and more volatile, hydrocarbons. This typically improves the quality of the hydrocarbon feedstock by increasing the hydrogen to carbon ratio. The significant economic benefit derived from hydrocracking processes has heavily contributed to its widespread use and the continued development of improved hydrocracking processes and catalysts.

The feedstock used in a conventional hydrocracking process typically comprise a vacuum gas oil (VGO) that boils in an approximate temperature range of 375–565° C. However, the feedstock may include other fractions such as demetallized or deasphalted oil (DMO or DAO), coker gas oils, or fluid catalytic cracking cycle oils, etc. which are also processed in hydrocracking units. Crude oils are generally treated in atmospheric distillation columns that recover distillates. The resulting atmospheric residue is then distilled in a vacuum distillation column to recover the vacuum distillates, such as VGO. However, due to the overlap between the distillation curves of the fractions, distillation is unable to efficiently separate the distillates from the VGO. Therefore, hydrocracking feedstocks typically contain distillates in a significant amount that are subsequently cracked in the hydrocracking reaction.

Additionally, a typical hydrocracking feedstock may also contain polynuclear aromatic (PNA) compounds. As the feedstock is subjected to hydrocracking at elevated temperatures and pressure, these PNA compounds may produce heavy poly nuclear aromatic (HPNA) compounds, that containing seven or more fused benzene rings. The HPNA molecules may form by dehydrogenation of larger aromatic molecules or by cyclization and dehydrogenation of various components, process that become more favoured as the reaction temperature increases. The formation of HPNAs is undesirable as they can be present in high concentrations in the unconverted hydrocracker bottoms and accumulate in the recycle system, resulting in equipment fouling. These impurities can also lower the overall efficiency of the hydrocracking process by requiring higher operating temperatures, higher hydrogen partial pressure or additional reactor/catalyst volume. In addition, high concentrations of impurities can accelerate catalyst deactivation HPNA formation must therefore be controlled during the hydrocracking process, though it depends on many factors, such as the type of feedstock, catalyst selection, process configuration, and operating conditions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to processes for the production of cracked hydrocarbons from a feedstock, where the feedstock includes a top portion that boils below 375° C. and a bottom portion that boils above 375° C. The processes may include stripping the feedstock in a stripper to isolate the top portion from the bottom portion, hydrocracking the bottom portion in one or more hydrocracking reactors to produce a hydrocracked effluent, separating the hydrocracked effluent in a separating unit to produce a light product stream, a distillate stream, and a heavy unconverted stream; and recycling the heavy unconverted stream to an earlier stage of the process.

In a further aspect, embodiments disclosed herein relate to systems for producing cracked hydrocarbons from a feedstock, where the feedstock includes a top portion that boils below 375° C. and a bottom portion that boils above 375° C. The systems may include a stripping unit configured to contact the feedstock with a vapor stream, one or more hydrocracking reactors and a separating unit. The stripping unit may feed the hydrocracking reactors, and the hydrocracking reactors may feed the separating unit. The separating unit may feed one or more of the group consisting of the stripping unit and one of the hydrocracking reactors.

Other aspects and advantages of the claimed subject matter will be apparent from the following description and the appended claims.

DETAILED DESCRIPTION

Embodiments in accordance with the present disclosure generally relate to processes and systems for hydrocracking a hydrocarbon feedstock. These process and systems include the stripping of the feedstock to give a low-boiling portion and a high-boiling fraction and subsequently hydrocracking the high-boiling fraction. The low-boiling fraction may be separately hydrotreated.

For the purposes of the present disclosure, accompanying components that are conventionally used in hydrocracking processes, such as air supplies, catalyst hoppers, gas handling apparatus, spent catalyst discharge sub-systems, catalyst replacement sub-systems, valves, temperature sensors, electronic controllers and the like, are not shown or discussed herein for sake of simplicity. One of ordinary skill in the art would appreciate that such components may be included in the embodiments disclosed herein.

Single-Stage Hydrocracking Processes and Systems

Figure 1:
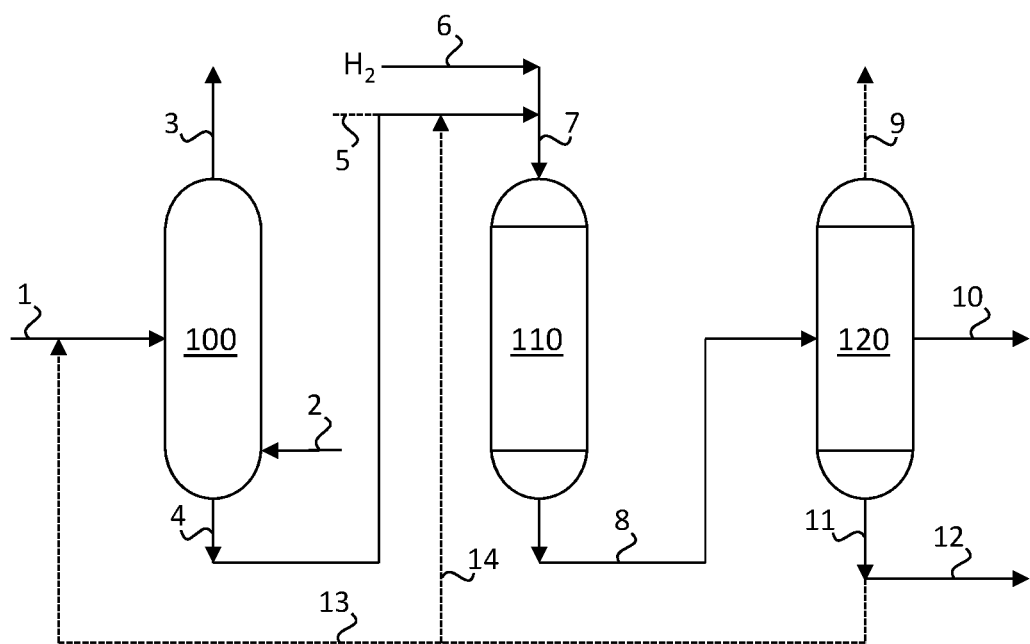
FIG. 1 is a schematic illustration depicting a process and system of one or more embodiments of the present disclosure.

FIG. 1 depicts a process and a system of one or more embodiments of the present disclosure, the system comprising a stripper 100, a single-stage hydrocracking reactor 110, and a separating unit 120.

A feedstock 1 is fed into the stripper 100. The feedstock is a hydrocarbon-containing feedstock that in one or more embodiments, may include a combination of diesel and vacuum gas oil (VGO). The VGO may comprise light vacuum gas oil (LVGO), middle vacuum gas oil (MVGO), and heavy vacuum gas oil (HVGO) fractions. In some embodiments, the feedstock may further comprise components such as demetallized or deasphalted oil (DMO or DAO), coker gas oils, and fluid catalytic cracking cycle oils. The feedstock may be described as containing a fraction comprising components having boiling points above 375° C. and a fraction comprising components having boiling points below 375° C. The feedstock of one or more embodiments may particularly comprise a fraction having components that boil in the range of 375° C. to about 565° C. and a fraction having components that boil in the range of 36° C. to about 375° C.

The feedstock 1 is stripped in the stripper 100 by physically separating one or more components from the liquid stream by the application of a vapor stream 2. The portion 3 removed by the vapor stream 2 may be referred to as the "stripper tops" or the "top portion." The portion that remains in the liquid phase 4 may be referred to as the "stripper bottoms" or the "bottom portion." In some embodiments, the top portion 3 may comprise lower-boiling point components than the bottom portion 4. In some embodiments, the vapor stream 2 may comprise one or more of the group consisting of $C_1$ to $C_6$ hydrocarbons, light naphtha, hydrogen, nitrogen, and steam. One of ordinary skill in the art would appreciate, with the benefit of this disclosure, that the selection of the vapor stream is dependent upon both the composition of the liquid stream, and the identity of the desired top portion. During stripping, the liquid stream 1 and vapor stream 2 may flow either co-currently or counter-currently.

In one or more embodiments, the stripping may be performed at a temperature in the range of from about 20° C. to about 200° C. and at an operating pressure in the range of from about 1 kg/cm² to about 10 kg/cm², and in certain embodiments, about 1 kg/cm² to 3 kg/cm².

The stripping of the present disclosure may be performed in any suitable stripping unit 100 that is known to one of ordinary skill in the art. In one or more embodiments, the stripping units may comprise one or more "continuous contact extractors" such as centrifugal contactors and contacting columns such as tray columns, spray columns, packed towers, rotating disc contactors and pulse columns.

In one or some embodiments, the bottom portion 4 may be combined with a heavy hydrocracking feedstock 5 and hydrogen gas 6 to give a combined hydrocracking inlet stream 7. In some embodiments, the hydrocracking inlet stream 7 may only comprise the bottom portion 4 and the hydrogen gas 6. The hydrocracking inlet stream 7 is hydrocracked in a hydrocracking reactor 110.

As described above, hydrocracking processes generally break the molecules of a feedstock into smaller, i.e. lighter, molecules. Hydrocracking processes in accordance with embodiments of the present disclosure generally comprise combining a hydrocarbon feed, such as the bottom portion 4, with hydrogen gas 6 and subjecting the mixture 7 to elevated temperatures in the presence of a hydrocracking catalyst.

In one or more embodiments, the hydrocracking of the present disclosure may be performed at a reaction temperature of about 300° C. to about 500° C., in certain embodiments about 330° C. to about 475° C., and in further embodiments about 330° C. to about 450° C.; a hydrogen partial pressure of about 60 kg/cm² to about 300 kg/cm², in certain embodiments about 100 kg/cm² to about 200 kg/cm², and in further embodiments about 130 kg/cm² to about 180 kg/cm²; a liquid hourly space velocity of about 0.1 h$^{-1}$ to about 10 h$^{-1}$, in certain embodiments about 0.25 h$^{-1}$ to about 5 h$^{-1}$, and in further embodiments about 0.5 h$^{-1}$ to about 2 h$^{-1}$; a hydrogen/oil ratio of about 500 normalized m³ per m³ (Nm³/m³) to about 2500 Nm³/m³, in certain embodiments about 800 Nm³/m³ to about 2000 Nm³/m³, and in further embodiments about 1000 Nm³/m³ to about 1500 Nm³/m³.

The hydrocracking of one or more embodiments may utilize any suitable hydrocracking catalyst or configuration known to one of ordinary skill in the art. Generally, such catalysts include a hydrogenative metal component and an acidic support component. In certain embodiments, the hydrocracking catalyst may include one or more of the group consisting of amorphous alumina catalysts, amorphous silica alumina catalysts, natural or synthetic zeolite-based catalyst. The hydrocracking catalyst can possess one or more metals selected from the group consisting of Pt, Pd, Ni, W, Mo, and Co. In particular embodiments, acidic alumina or silica alumina based supported catalysts that comprise Ni and one or more of Mo and W may be used. One of ordinary skill in the art will appreciate that the selection of a hydrocracking catalyst and conditions are dependent upon both the composition of the feedstock and the identity of the desired products. For instance, an undiluted 100% DMO or DAO feedstock may be hydrocracked under more severe conditions than one containing VGO, since the DMO or DAO stream may contain a greater percentage of nitrogen compounds and a higher micro carbon residue (MCR) content than the VGO stream.

The hydrocracking of one or more embodiments may be a single-stage process. Single-stage hydrocracking may be performed at operating conditions that are more severe than hydrotreating processes, and less severe than conventional full pressure hydrocracking processes. In some embodiments, dual catalyst systems may be used in a stacked-bed configuration.

The hydrocracking generates a hydrocracked effluent 8, which may be fed to a separating unit 120. In one or more embodiments, the separating unit 120 may comprise a fractionator column that separates light gases 9 (such as $C_{1-4}$ hydrocarbons, ammonia, and hydrogen sulphide) from distillates 10 (such as naphtha, kerosene and diesel products) and heavier, unconverted cracking bottoms 11. In some embodiments, the distillates may comprise components that boil in the temperature range of about 36-375° C. The unconverted cracking bottoms 11 may comprise hydrocarbons that boil above 375° C.

The light gas streams 9 may comprise one or more of hydrogen, hydrogen sulphide, ammonia, and light ($C_{1-4}$) hydrocarbons. In some embodiments, the light gas stream 9 may be recovered and further processed by methods known to one of ordinary skill in the art including, for example, the recovery and recycling of hydrogen. In some embodiments, the distillate stream 10 may be discharged and further processed/blended in downstream refinery operations to produce one or more of gasoline, kerosene, and diesel fuel, and other petrochemical products.

In certain embodiments, the separating unit 120 may operate as a flash vessel to separate heavy components at a suitable cut point, for example, one corresponding to the upper temperature range of the gasoline, kerosene, or diesel fuel. In certain embodiments, a suitable cut point may be in the range of 350 to 400° C.

In some embodiments, a portion of the cracking bottoms 11 may be drawn into a bleed stream 12. The bleed stream 12 may be hydrogen-rich and, thus, can be effectively integrated with certain fuel oil pools, or serve as a stream for various processes that are not shown, including fluidized catalytic cracking or steam cracking. In one or more embodiments, the remainder of the cracking bottoms 11 are recycled to an earlier stage of the process. In one or more embodiments, the cracking bottoms 11 may be recycled 13 and combined with the feedstock 1 upstream of the stripper 100. Additionally, or alternatively, in one or more embodiments the cracking bottoms 11 may be recycled 14 and combined with the hydrocracking inlet stream 7 upstream of the hydrocracking reactor 110.

Figure 2:
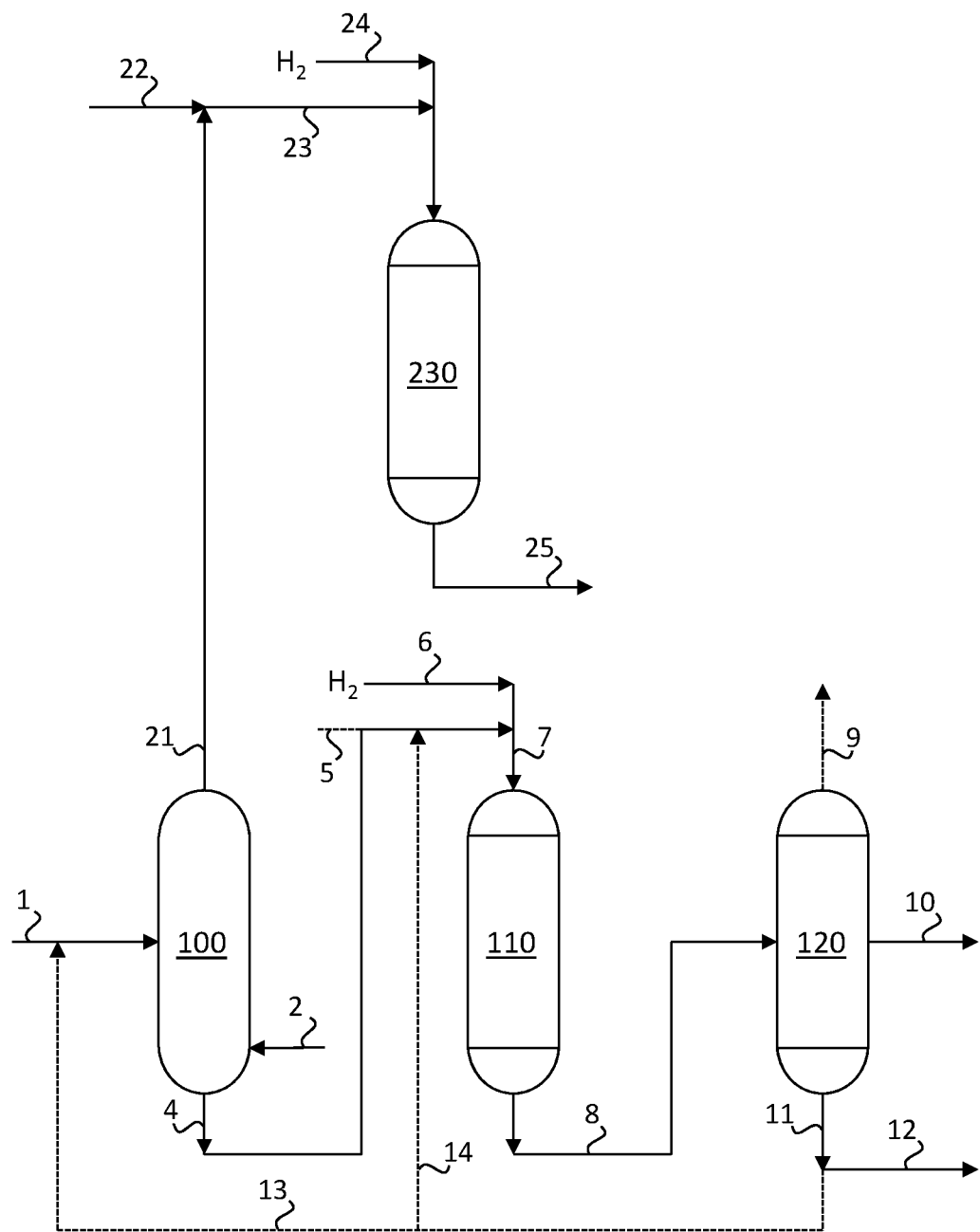
FIG. 2 is a schematic illustration depicting a process and system of one or more embodiments of the present disclosure.

FIG. 2 depicts a process and a system of one or more embodiments of the present invention, the system comprising a stripper 100, a single-stage hydrocracking reactor 110, a separating unit 120, and a hydrotreating reactor 230. It is noted that components 100, 110, and 120, and streams 1-2 and 4-14, shown in FIG. 2, are the same as discussed above with regard to FIG. 1 and, though their description is not repeated, each stream, component, and condition described above is also present in the embodiment shown in FIG. 2.

Generally, the processes represented by FIG. 2 differ from those represented by FIG. 1 in that the feedstock 1 is stripped 100 to give a top portion 21 that may be combined with a diesel hydrotreating feedstock 22. The resulting combined hydrotreating stream 23 may be mixed with hydrogen gas 24 and hydrotreated in a hydrotreating reactor 230.

The diesel hydrotreating feedstock 22 of one or more embodiments may generally be a middle distillate feedstock. In some embodiments, the feedstock 10 may comprise one or more fractions selected from naphtha, kerosene, diesel, and gas oil. Embodiments, the distillate feedstock may comprise a diesel fraction. The feedstock of some embodiments may further comprise vacuum gas oil (VGO) components such as light vacuum gas oil (LVGO) and middle vacuum gas oil (MVGO). The diesel hydrotreating feedstock 22 of one or more embodiments may be atmospheric and/or vacuum distillates and may be selected from one or more of jet fuel, kerosene, straight run diesel, light cycle oil, light coker gas oil, gas oil, heavy cycle oil, heavy coker gas oil, heavy gas oil, resid, deasphalted oil, and combinations of two or more thereof.

In one or more embodiments, the diesel hydrotreating feedstock 22 may have an initial boiling point of any of 150, 160, 170, 180, 190, 200, and 220° C., and a final boiling point of any of 350, 360, 370, 375, 380, 390, 400, 410, and 430° C. In one or more embodiments, the feedstock 22 in accordance with the present disclosure may be a hydrocarbon fraction having a boiling point ranging from about 170 to 400° C. In further embodiments, the diesel hydrotreating feedstock 22 in accordance with the present disclosure may be a hydrocarbon fraction having a boiling point ranging from about 180 to 375° C.

The diesel hydrotreating feedstock 22 of one or more embodiments may contain undesirably high amounts of one or more of sulfur, nitrogen, and aromatic components. The meaning of the term "undesirably high" refers to an amount that is too great for the intended purpose of the resulting product, as would be understood by one of ordinary skill in the art.

In one or more embodiments the diesel hydrotreating feedstock 22 may have a sulfur content of 1000 parts per million by weight (ppmw) or more, 2500 ppmw or more, 5000 ppmw or more, 7500 ppmw or more, 10000 ppmw or more, or 15000 ppmw or more. In one or more embodiments, the hydrocarbon feedstock may have a nitrogen content of ppmw or more, 150 ppmw or more, 200 ppmw or more, 250 ppmw or more, 300 ppmw or more, or 500 ppmw or more.

Hydrotreating is a process wherein a hydrocarbon-containing feedstock is contacted with hydrogen gas in the presence of one or more hydrotreating catalysts that primarily effect the removal of one or more heteroatoms (such as sulfur and nitrogen) from the hydrocarbon-containing feedstock. During hydrotreating processes, unsaturated hydrocarbons such as olefins, alkynes and aromatics may become saturated through reaction with hydrogen.

In one or more embodiments of the present disclosure, the hydrotreating catalyst used may be any suitable catalyst that is known to one of ordinary skill in the art. Hydrotreating catalysts of some embodiments may comprise one or more metals selected from the group consisting of molybdenum, tungsten, iron, cobalt, and nickel. The active metals may be supported to provide a greater surface area. More than one type of hydrotreating catalyst may be used in the same reactor. In some embodiments, that are not shown, multiple hydrotreating reactors may be used in series. In embodiments where multiple hydrotreating reactors are used, each reactor may be primarily directed to the removal of a different component, such as desulfurization and denitrification.

In some embodiments, the hydrotreating of the present disclosure may be performed at a reaction temperature of about 250° C. to 450° C., and in particular embodiments of about 300° C. to 400° C.; a hydrogen partial pressure of about 20 $Kg/cm^2$ to about 100 $Kg/cm^2$, and in particular embodiments of about 30 $Kg/cm^2$ to about 80 $Kg/cm^2$; a liquid hourly space velocity of about 0.5 $h^{-1}$ to about 5 $h^{-1}$, and in particular embodiments of about 1.0 $h^{-1}$ to about 2 $h^{-1}$; a hydrogen/oil ratio of about 200 normalized $m^3$ per $m^3$ (Nm/m) to about 1000 $Nm^3/m^3$, and in particular embodiments of about 300 $Nm^3/m^3$ to about 500 $Nm^3/m^3$.

In one or more embodiments, the hydrotreating yields a hydrotreated effluent 25. The hydrotreated effluent 25 may be recovered and further processed by any method known to one of ordinary skill in the art. In some embodiments, that are not shown, hydrogen gas may be recovered from the hydrotreated effluent 25. This hydrogen gas may, in some embodiments, be recycled and used, for example, as one or more of hydrogen streams 6 or 24.

The hydrotreated effluent 25 of one or more embodiments may have a significantly lower sulfur content than the combined hydrotreating stream 23. In one or more embodiments, the hydrotreated effluent 25 may have a sulfur content of less than 100 ppmw, of less than 10 ppmw, of less than 5 ppmw, of less than 1 ppmw, of less than 0.5 ppmw, or of less than 0.2 ppmw.

Figure 3:
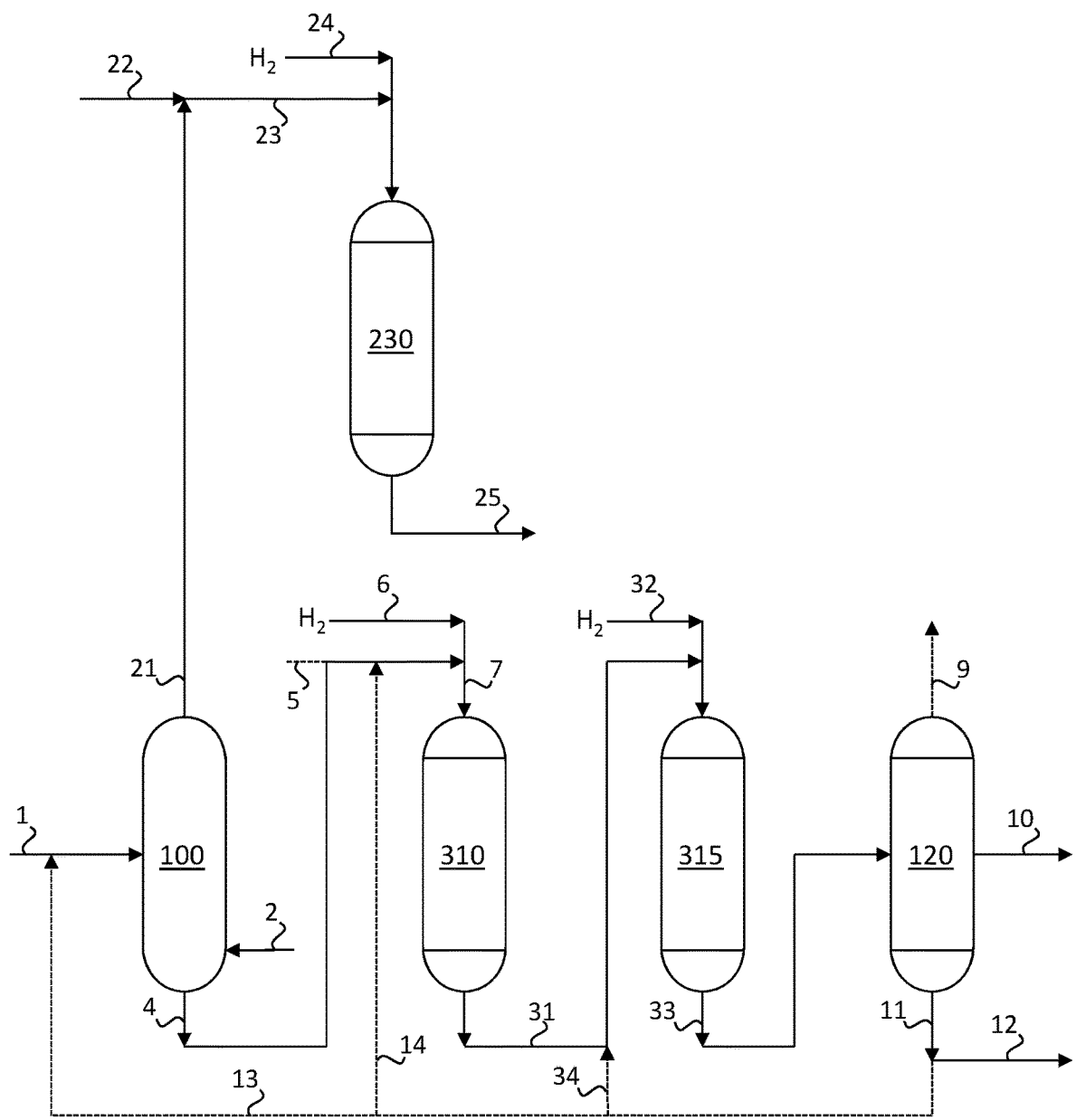
FIG. 3 is a schematic illustration depicting a process and system of one or more embodiments of the present disclosure.

The hydrotreated effluent 25 of one or more embodiments may have a significantly lower nitrogen content than the combined hydrotreating stream 23. In one or more embodiments, the hydrotreated effluent 25 may have a nitrogen content of less than 100 ppmw, of less than 10 ppmw, of less than 5 ppmw, of less than 1 ppmw, of less than 0.5 ppmw, or of less than 0.2 ppmw Multi-Stage Hydrocracking Processes and Systems FIG. 3 depicts processes and systems of one or more embodiments of the present invention, the system comprising a stripper 100, a separating unit 120, a hydrotreating reactor 230, a first hydrocracking reactor 310, and a second hydrocracking reactor 315. It is noted that components 100, 120, and 230, and streams 1-2, 4-7, 9-14, and 21-25 are the same as discussed above with regard to FIGS. 1 and 2 and, though their description is not repeated, each stream, component, and condition described above is also present in the embodiment shown in FIG. 3.

Generally, the processes represented by FIG. 3 differ from those represented by FIG. 2, discussed above, in that the hydrocracking inlet stream 7 may be subjected to a multi-stage hydrocracking process. In some embodiments, the multi-stage hydrocracking process may be a hydrocracking process that comprises a first-stage hydrocracking reactor 310 and a second-stage hydrocracking reactor 315 in series (as illustrated in FIG. 3).

In one or more embodiments, the hydrocracking inlet stream 7 may be hydrocracked in a first hydrocracking reactor 310 to give a first hydrocracked effluent 31. The first hydrocracked effluent 31 may then be mixed with hydrogen gas 32 and subjected to a second hydrocracking reaction in a second hydrocracking reactor 315 to give a second hydrocracked effluent 33. The second hydrocracked effluent 33 may then be separated in a similar manner to the hydrocracked effluent 8 of FIG. 1.

In some embodiments, the cracking bottoms 11 may not only be recycled 13 upstream of the stripper 100 and/or recycled 14 upstream of the hydrocracking reactor 310, but additionally or alternatively, recycled 34 downstream of the first hydrocracking reactor 310 and upstream of the second hydrocracking reactor 315, for further hydrocracking. Since the first reactor 310 accomplishes both hydrotreating and hydrocracking, the stream to the second reactor 315 contains ammonia and hydrogen sulfide. Therefore, in one or more embodiments, the second hydrocracking process may use high performance zeolite catalysts at a cost of catalyst activity. In one or more embodiments, the second hydrocracking process/reactor 315 may be operated at a higher temperature than the first hydrocracking process/reactor 310.

Figure 4:
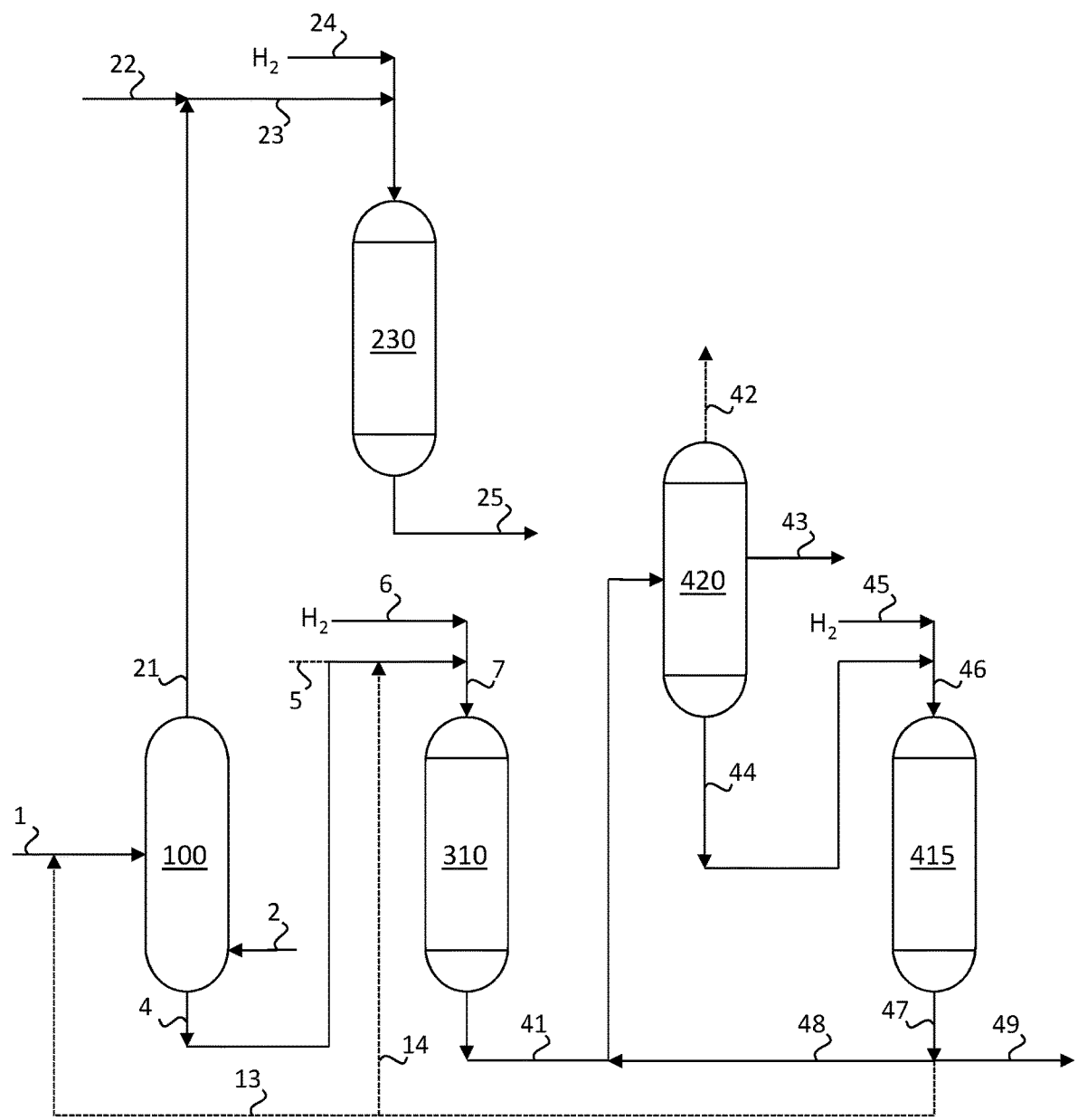
FIG. 4 is a schematic illustration depicting a process and system of one or more embodiments of the present disclosure.

FIG. 4 depicts processes and systems of one or more embodiments of the present invention, the system comprising a stripper 100, a hydrotreating reactor 230, a first hydrocracking reactor 310, a separating unit 420, and a second hydrocracking reactor 415. It is noted that components 100, 230, and 310 and streams 1-2, 4-7, 13-14, and 21-25 are the same as discussed above with regard to FIGS. 1-3 and, though their description is not repeated, each stream, component, and condition described above is also present in the embodiments shown in FIG. 4.

Generally, the processes represented by FIG. 4 differ from those of FIG. 3 in that the first hydrocracked effluent 41 is separated 420 upstream of the second hydrocracking process 415. In one or more embodiments, the separating unit 420 may comprise a fractionator column and separates light gases 42 (such as $C_{1-4}$ hydrocarbons, ammonia, and hydrogen sulphide) from distillates 43 (such as naphtha, kerosene and diesel products) and heavier, unconverted cracking bottoms 44. The unconverted cracking bottoms 44 may then be mixed with hydrogen 45 to give a second hydrocracking inlet stream 46 that is subjected to a second hydrocracking process in a second hydrocracking reactor 415.

The second hydrocracking process generates a second hydrocracked effluent 47. In some embodiments, a portion of the second hydrocracked effluent 47 may be drawn into a bleed stream 49 similar to that discussed above for FIG. 1. In one or more embodiments, a portion of the second hydrocracked effluent 47 may be recycled to an earlier stage of the process. For instance, a portion may be recycled 48 downstream of the first hydrocracking reactor 310 and upstream of the separating unit 420.

In one or more embodiments, such as those depicted by FIG. 4, a remaining portion of the second hydrocracked effluent 47 may be recycled 13 and combined with the feedstock 1 upstream of the stripper 100.

Figure 5:
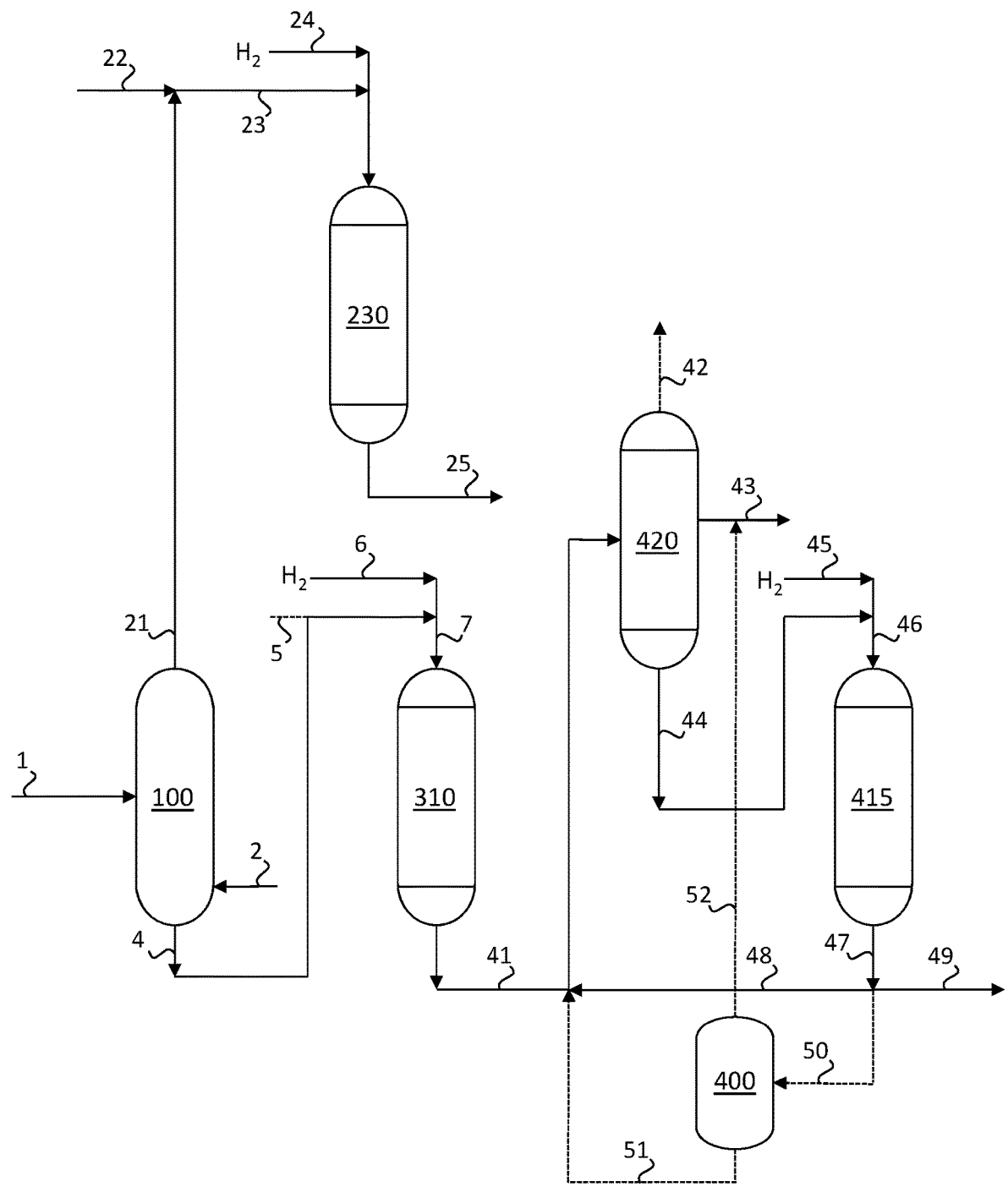
FIG. 5 is a schematic illustration depicting a process and system of one or more embodiments of the present disclosure.

FIG. 5 depicts processes and systems of one or more embodiments of the present invention, the system comprising a stripper 100, a hydrotreating reactor 230, a first hydrocracking reactor 310, a separating unit 420, a second hydrocracking reactor 415, and a second stripper 400. It is noted that components 100, 230, 310, and 420, and streams 1-2, 4-7, 21-25, and 42-49 are the same as discussed above with regard to FIGS. 1-4 and, though their description is not repeated, each stream, component, and condition described above is also present in the embodiments shown in FIG. 5.

Generally, the processes represented by FIG. 5 differ from those of FIG. 4 in that a remaining portion 50 of the second hydrocracked effluent 47 may be fed into a second stripper 400. Before the second stripping 400, the second hydrocracked effluent 47 may be subjected to a second separating process (not shown) that removes gases (such as $C_1$ to $C_4$ hydrocarbons, ammonia, hydrogen sulphide and/or naphtha) from heavier, liquid-phase components. A second stripping process may generate a second top portion 52 and a second bottom portion 51. In some embodiments, the second top portion 52 may primarily comprise distillates and be combined with the distillates 43 produced by the separating unit 420. The second bottom portion 51 may be recycled downstream of the first hydrocracking reactor 310 and upstream of the separating unit 420.

The second stripping 400 of one or more embodiments may comprise a vapor stream that contains one or more of the group consisting of $C_1$ to $C_6$ hydrocarbons, light naphtha, hydrogen, nitrogen, and steam. One of ordinary skill in the art would appreciate, with the benefit of this disclosure, that the selection of the vapor stream is dependent upon both the composition of the liquid stream, and the identity of the desired top portion. During stripping, the liquid stream and vapor stream may flow either co-currently or counter-currently. In one or more embodiments, the second stripping 400 may be performed at a temperature in the range of from about 20° C. to about 200° C. and at an operating pressure in the range of from about 1 Kg/Cm$^2$ to about 10 Kg/Cm$^2$, and in certain embodiments, about 1 Kg/Cm$^2$ to 3 Kg/Cm$^2$.

Figure 6:
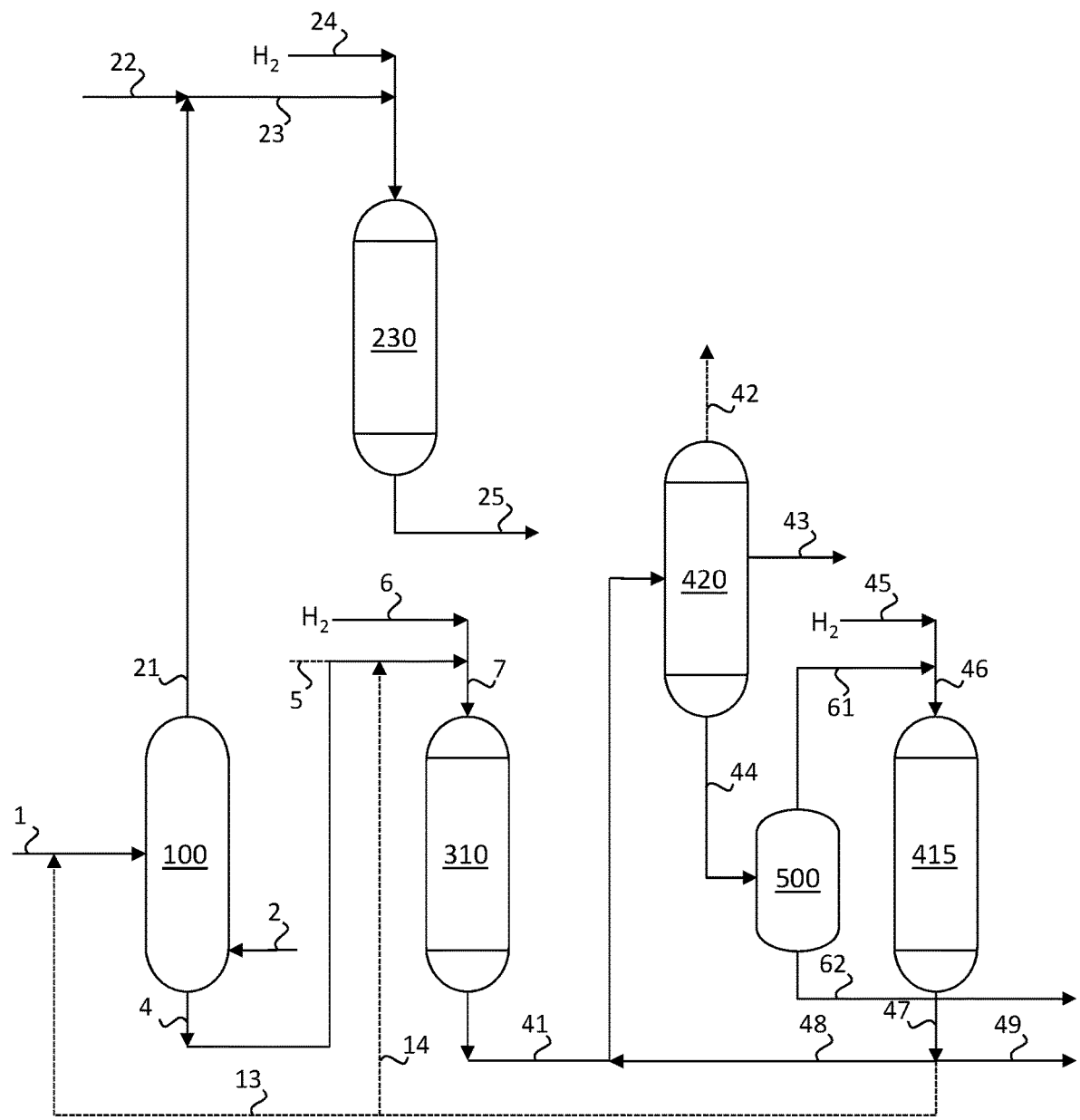
FIG. 6 is a schematic illustration depicting a process and system of one or more embodiments of the present disclosure.

FIG. 6 depicts processes and systems of one or more embodiments of the present invention, the system comprising a stripper 100, a hydrotreating reactor 230, a first hydrocracking reactor 310, a separating unit 420, a second hydrocracking reactor 415, and a second stripper 500. It is noted that components 100, 230, 310, and 420, and streams 1-2, 4-7, 13-14, 21-25, and 42-49 are the same as discussed above with regard to FIGS. 1-5 and, though their description is not repeated, each stream, component, and condition described above is also present in the embodiments shown in FIG. 6.

Generally, the processes represented by FIG. 6 differ from those of FIG. 4 in that the heavier, unconverted cracking bottoms 44 that are generated by the separating unit 420 are fed to a second stripper 500. The stripper 500 of one or more embodiments provides a top portion 61 which may then be mixed with hydrogen 45 to give the second hydrocracking inlet stream 46 that is subjected to the second hydrocracking process in the second hydrocracking reactor 415. The stripper 500 also provides a bottom portion 62 which, in one or more embodiments, may contain HPNAs. The bottom portion 62 may be a bleed stream.

The second stripping 500 of one or more embodiments may comprise a vapor stream that contains one or more of the group consisting of $C_1$ to $C_6$ hydrocarbons, light naphtha, hydrogen, nitrogen, and steam. One of ordinary skill in the art would appreciate, with the benefit of this disclosure, that the selection of the vapor stream is dependent upon both the composition of the liquid stream, and the identity of the desired top portion. During stripping, the liquid stream and vapor stream may flow either co-currently or counter-currently. In one or more embodiments, the second stripping 400 may be performed at a temperature in the range of from about 20° C. to about 200° C. and at an operating pressure in the range of from about 1 Kg/Cm² to about 10 Kg/Cm², and in certain embodiments, about 1 Kg/Cm² to 3 Kg/Cm².

EXAMPLES

The following examples are merely illustrative and should not be interpreted as limiting the scope of the present disclosure.

To illustrate the impact of feedstock stripping on overall process performance, two examples are provided herein that detail the processing of a feedstock. The composition and properties of the feedstock is given in Table 1.

TABLE 1

Composition of the feedstock

| Property | Units | Fraction | | |
|---|---|---|---|---|
| | | LVGO | HVGO | DMO |
| Volume | vol. % | 21.3 | 63.7 | 15.0 |
| Specific Gravity | g/cm³ | 0.8857 | 0.9156 | 0.9714 |
| API | ° | 28.3 | 23.0 | 14.2 |
| Sulfur | wt. % | 1.90 | 2.17 | 3.21 |
| Nitrogen | wppm | 360 | 798 | 1,825 |
| Micro Carbon Residue | wt. % | 0.3 | 1 | 9.58 |
| Bromine Number | g/100 g | 5 | 7 | 10 |
| Hydrogen NMR | wt. % | 12.55 | 12.35 | 11.43 |
| Simulated Distillation Method | | D2887 | D2887 | D6352 |
| Initial Boiling Point | ° C. | 151 | 297 | 416 |
| 5% | ° C. | 246 | 358 | 465 |
| 10% | ° C. | 275 | 383 | 514 |
| 30% | ° C. | 332 | 426 | 570 |
| 50% | ° C. | 369 | 456 | 611 |
| 70% | ° C. | 401 | 487 | 660 |
| 90% | ° C. | 440 | 533 | 750 |
| 95% | ° C. | 461 | 553 | |
| Final Boiling Point | ° C. | 533 | 593 | |
| bp < 375° C. | wt. % | 53.3 | 8.03 | |

As seen in Table 1, the light VGO and heavy VGO fractions comprise hydrocarbons that have a boiling point below 375° C. in an amount of 53.3 wt. % and 8.03 wt. %, respectively. The above feedstock was processed in a hydrocracking unit both with initial stripping (Example 1) and without stripping (Comparative Example 1). The operating conditions for both examples are shown in Table 2.

TABLE 2

| Condition | Units | Com. Ex. 1 | Ex. 1 |
|---|---|---|---|
| Capacity | BPSD | 31,500 | 31,500 |
| H₂ Pressure | barg | 115 | 115 |
| LHSV | h⁻¹ | 0.80 | 0.667 |
| H₂/oil | NL/L | 1,263 | 1,263 |
| Temperature Rx 1 (Hydrocracking Reactor 110) | ° C. | 385 | 385 |

TABLE 2-continued

| Condition | Units | Com. Ex. 1 | Ex. 1 |
|---|---|---|---|
| Temperature Rx 2 (Separating Unit 120) | ° C. | 370 | 370 |
| Weighted Average Bed Temperature (WABT) | ° C. | 381 | 381 |
| Conversion | Wt. % | 66.8 | 73.5 |

As seen, 5,200 BPSD (barrels per stream day, 16.5 wt. % of total feedstock) of diesel was been recovered with the stripping and sent to diesel hydrotreating unit for sulfur removal. This lowered the overall liquid hourly space velocity (LHSV) of the hydrocracking unit to 0.67 h⁻¹ from 0.8 h⁻¹, resulting in the conversion being increased to 73.5 wt. % from 66.8 wt. % and mid distillate yield increased by 4.3 wt. %. When combined with the distillates recovered in stripping, the process gains about 20 wt. % of distillates.

Advantageously, embodiments of the present disclosure enable the separation of low-boiling components from a hydrocracking feedstock, improving the performance of the hydrocracking unit by preventing further cracking of the distillates and enhancing the recovery of the distillates. Additionally, embodiments of the present disclosure may lead to the decreased formation of HPNAs, increasing the efficiency of the hydrocracking process and decreasing equipment fouling.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A system for producing cracked hydrocarbons from a feedstock that comprises a top portion that boils below 375° C. and a bottom portion that boils above 375° C., the system comprising:
   a stripping unit configured to contact the feedstock with a vapor stream;
   one or more hydrocracking reactors;
   a separating unit; and
   a hydrotreating reactor configured to receive the top portion that is fed from the stripping unit, wherein the hydrotreating reactor is not in fluid communication with the hydrocracking reactors or the separating unit;
   wherein the stripping unit feeds the bottom portion to hydrocracking reactors, and the hydrocracking reactors feed the separating unit, and
   wherein the separating unit feeds one or more of the group consisting of the stripping unit and one of the hydrocracking reactors.

2. The system of claim 1, wherein the system comprises two or more of the hydrocracking zones connected in series.

3. The system of claim 1, wherein the stripping unit is fed by the separating unit.

4. The system of claim 1, further comprising an additional hydrocracking reactor that is downstream of the separating unit.

5. The system of claim 4, further comprising a second stripping unit.

6. The system of claim 5, wherein the additional hydrocracking reactor feeds the second stripping unit.

7. The system of claim 6, wherein the second stripping unit feeds the separating unit.

8. The system of claim 5, wherein the second stripping unit is fed by the separating unit and feeds the additional hydrocracking reactor.

* * * * *